United States Patent Office 3,230,222
Patented Jan. 18, 1966

3,230,222
TRI-(UNSUBSTITUTED SULFONATED NAPH-
THYL) TRIMETHYLENETRIAMINES
Frederick S. Kaveggia, Los Angeles, and Isidore Pollack,
Westminster, Calif., assignors to Purex Corporation,
Ltd., Lakewood, Calif., a corporation of California
No Drawing. Filed Aug. 17, 1962, Ser. No. 217,545
3 Claims. (Cl. 260—248)

This invention relates to a novel group of compounds, and is particularly concerned with a novel group of compounds in the form of cyclic triaryl trimethylenetriamines, many of which have properties as dyes when exposed to ordinary daylight, within the visible region of the spectrum, and some of which also have fluorescent properties, and to a method of preparation of these compounds.

Fluorescent dyes, as well as ordinary dyes, are now widely used in many arts. Thus, for example, both types of dyes are employed as textile dyes and are also used in inks, paints, and pigments, and fluorescent dyes particularly are employed in dye penetrant compositions for inspection of the surface of objects, to detect cracks and flaws therein. The most valuable types of fluorescent dyes are those which exhibit a bright fluorescence within the visible spectrum when excited by light of the proper wave length, e.g., ultraviolet or so-called "black light."

It is an object of the invention to provide a novel class of compounds, many of which possess dye and/or fluorescent dye characteristics.

A particular object of the invention is the provision of a group of novel compounds characterized by the presence therein of a trimethylene triamine ring, certain of which derivatives particularly exhibit bright fluorescence.

Still another object is to afford novel, essentially water soluble dyes having a yellow to red emission within the visible spectrum.

A still further object is to provide a class of essentially water soluble, fluorescent dyes certain of which have a bright red fluorescent emission within the visible spectrum.

Yet another object is the provision of procedure for producing the compounds of the invention.

Still another object is the provision of procedure for treating natural and synthetic fibers or textiles with compounds of the invention for coloring said fibers or textiles.

Other objects and advantages will appear hereinafter.

We have unexpectedly found that by reacting a sulfonated primary aromatic amine such as a sulfonated phenyl or naphthyl primary amine, and including sulfonated primary aromatic amines further substituted on the aromatic nucleus, with a lower aliphatic aldehyde, such as formaldehyde, at elevated temperature under alkaline-free conditions, and preferably employing substantially equimolar proportions of amine and aldehyde, a group of sulfonated cyclic triaryl trimethylene triamine dyes is obtained, which have utility as textile dyes, and certain of which in addition have good to excellent fluorescent characteristics.

Many of the dyes thus formed are suitable for dyeing both natural and synthetic fibers such as Acrilan, Cresalan, nylon, silk, wool and Zefran. The dyes formed may range in color from yellow to red. Certain of such dyes also exhibit fluorescent characteristics, and thus possess the dual function of providing colored fibers of the type above listed, which have a bright, e.g., red coloration in daylight, and which emit a bright, e.g., red fluorescence, when the fibers are exposed to ultraviolet light.

The compounds or dyes produced according to the invention have the following general formula:

(I) 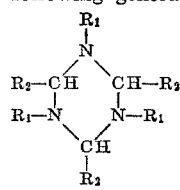

where $R_1$ is a sulfonated aryl group attached through a carbon atom of the aromatic nucleus directly to a ring N atom, e.g., a mono-, di- or tri-sulfonated phenyl or naphthyl group, and including substituted sulfonated aryl groups such as sulfonated hydroxyaryl, sulfonated halogeno aryl, sulfonated amino aryl, and sulfonated azo aryl groups; and $R_2$ is hydrogen, or a lower alkyl group of from 1 to 3 carbon atoms, preferably hydrogen.

In a preferred class of compounds according to the invention, $R_1$ in Formula I above can be mono-, di- or tri-sulfonated phenyl or naphthyl group; or a hydroxy substituted sulfonated aryl group such as a mono-, di- or tri-hydroxy sulfonated aryl group, e.g., a so hydroxylated mono-, di-, or tri-sulfonated phenyl or naphthyl group, the sulfonated naphthyl and sulfonated hydroxy naphthyl groups being preferred, with $R_2$ being hydrogen.

The reaction for producing the above compounds of Formula I is carried out by heating under the conditions noted above, a lower aliphatic aldehyde of from 1 to 4 carbon atoms, such as formaldehyde, propionaldehyde or butyraldehyde, preferably formaldehyde, with a sulfonated primary amino aryl compound including substituted sulfonated primary amino aryl compounds, e.g., containing hydroxy, halogen, amino or $R_3N=N-$ groups as defined below. More specifically, such sulfonated primary amino aryl compound can be of the type having the formula (II) 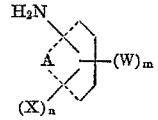

where A represents the atoms necessary to complete an aromatic nucleus, e.g., phenyl or naphthyl, W is a member of the group consisting of hydrogen and $SO_3Z$ groups, where Z is hydrogen or an alkali metal, e.g., sodium or potassium, X is a substituent of the group consisting of hydrogen, hydroxy, halogen, amino, $R_3-N=N-$, where $R_3$ is aryl, e.g., phenyl or naphthyl, and sulfonated aryl groups; all of said X's being the same or different; n is an integer of at least 1, e.g., 1 to 3, and m is an integer of at least 1, e.g., 1 to 3, not more than one of said X substituents being said $R_3N=N-$ group, and wherein W can be hydrogen only when said $R_3$ is a sulfonated aryl group. All of the $SO_3Z$ groups may be $SO_3H$ groups or the $SO_3Z$ groups may comprise a combination of $SO_3H$, and either $SO_3Na$ or $SO_3K$ groups. Preferably there is at least one $SO_3H$ group present in order to obtain the preferred acidity for reaction with the aldehyde according to the invention, as described in greater detail below.

Examples of sulfonated primary amino aryl compounds which may be employed for reaction with an aldehyde to produce the compounds or dyes of the invention by the reaction described herein are the following:

1-naphthylamine-3,6,8-trisulfonic acid (Koch acid); 8-amino-1-naphthol-3,6-disulfonic acid (H acid); 2-amino-5-naphthol-7-sulfonic acid (J acid); 2-amino-4-naphthol-8-sulfonic acid; 1-naphthylamine-8 - sulfonic acid (peri acid); 1-naphthylamine-3-sulfonic acid; 1-naphthylamine - 5 - sulfonic acid; 1-naphthylamine-2,4- disulfonic acid; 1-naphthylamine-3,6-disulfonic acid; 1-naphthylamine-4,6,8-trisulfonic acid; 2-naphthylamine-6-sulfonic acid; 2-naphthylamine-4,6,8-trisulfonic acid; 1-aminobenzene-3-sulfonic acid; 1-aminobenzene-2,4-disulfonic acid; 1-aminobenzene-2,5-disulfonic acid; 1,3-diaminobenzene-2,5-disulfonic acid; 1,3-diaminobenzene-4,5-disulfonic acid; 1-naphthylamine-4-chloro-8-sulfonic acid; 1-amino-4-chlorobenzene-2-sulfonic acid; 1-amino-4-hydroxybenzene-3-sulfonic acid; 1,4-dihydroxy-2-amino benzene-5-sulfonic acid; 1,2-dihydroxy-4-amino naphthalene-8-sulfonic acid; 4-amino azo benzene-4'-sulfonic acid; 4-amino azo benzene-3,4'-disulfonic acid; 4-amino-2,2'-azo naphthalene 4'-sulfonic acid, and the like.

The preferred aldehyde reactant, as previously noted, is formaldehyde. This material is conveniently available commercially as a formalin solution, e.g., of 30 to 40% strength, and such aqueous solution of formaldehyde can be employed directly in the reaction. However, other formaldehyde sources can be employed, such as hexamethylenetetramine, trioxane or paraformaldehyde.

The reaction can be carried out in non-aqueous medium or in aqueous solution. Many of the above described sulfonated primary aromatic amines are soluble to a greater or lesser extent in water, depending upon the number of solubulizing groups, e.g., sulfo, amino or hydroxy groups, which may be present, and on any other aliphatic or aromatic substituents which may also be present. The aldehydes containing from 1 to 4 carbon atoms, i.e., from formaldehyde to butyraldehyde, and the above noted formaldehyde generators, are also water soluble.

Where the reaction takes place in aqueous solution, the reaction is preferably carried out under acid conditions, usually mildly acid, e.g., at a pH of not less than about 3, preferably in a pH range of about 4 to about 5. Such conditions can be attained initially by use of the sulfonated primary aromatic amine reactants described above, wherein at least one of the sulfo groups is a free $SO_3H$ group. However, if desired, the pH of the reaction medium can be suitably adjusted for the desired pH conditions, with a suitable acid such as formic or dilute sulfonic acid. Alkaline reaction conditions are avoided, as such conditions appear to affect adversely the course of the reaction for producing the cyclic trimethylene triamine compounds of the invention.

Alternatively, the reaction may be carried out under initially substantially anhydrous conditions at the elevated temperatures noted below, or by employing a suitable solvent for the reactants, having a sufficiently high boiling point to prevent substantial volatilization thereof from the reaction mixture, such as ethylene glycol or hexylene glycol.

In carrying out the condensation reaction between the aldehyde, preferably formaldehyde, and the sulfonated primary aromatic amines described above, it is preferred to employ approximately equimolar proportions of aldehyde and amine, it being noted that 3 moles of the aldehyde, e.g., formaldehyde, condense with 3 mols of the sulfonated primary aromatic amine to form one mole of the trimethylene triamine compound illustrated in Formula I above, splitting off 3 mols of water in the condensation reaction. However, particularly where the highly volatile formaldehyde is employed as reactant, it is desirable to employ an excess of the aldehyde reactant, to insure the presence of at least sufficient aldehyde during the reaction to react with substantially all of the sulfonated primary aromatic amine reactant present. Thus, for example up to about 2 mols, but usually not more than about 1.5 mols, of aldehyde such as formaldehyde, can be employed per mol of aromatic amine.

The reaction is made to occur by heating the reaction mixture to temperature usually greater than about 75° C., e.g., from about 80° to about 100° C. Higher reaction temperatures can be employed, but usually are not preferred since such temperatures cause rapid volatilization of the aldehyde, particularly formaldehyde, out of the reaction mixture. Time of reaction varies depending on the particular reactants employed, and may range from about 10 to about 30 minutes.

The reaction products are generally soluble in water, due to the presence of sulfo groups, as well as other solubilizing substituents which may be present, e.g., hydroxy and/or amino groups. The products under these conditions can be recovered by evaporating off the water and drying the solid products, either by air drying at normal temperatures or by drying at elevated temperature but well below the decomposition temperature of the product.

Where the reaction is carried out under initially anhydrous conditions, the major portion of the water formed in the reaction is evaporated during the course of the reaction, and any additional water present in the final reaction product may be driven off by further drying of the solid product.

Where the reaction is carried out in an organic solvent medium, the solvent and any remaining water can be distilled off from the reaction mixture after completion of the reaction, using vacuum distillation if necessary to prevent product decomposition.

Examples of products produced according to the invention are as follows:

(a)
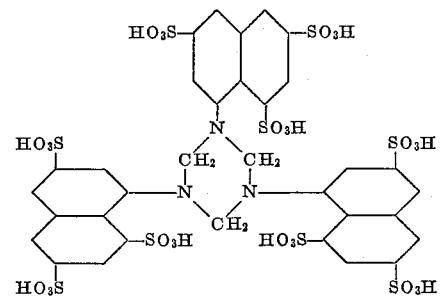

(b)
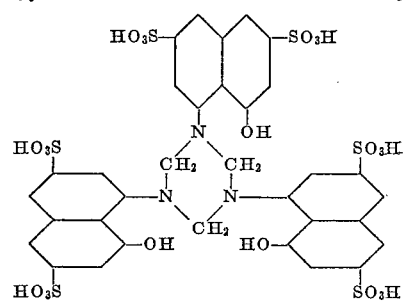

(c)
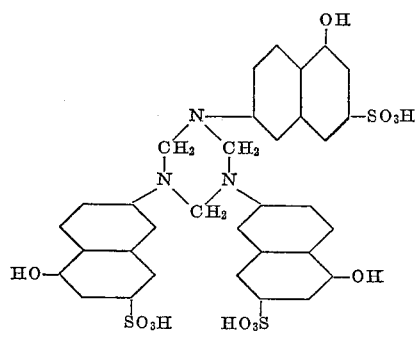

(d)
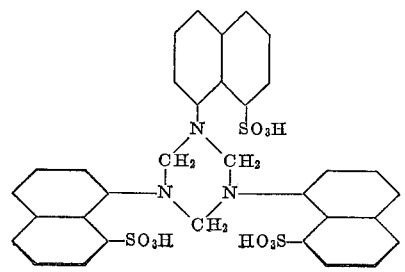

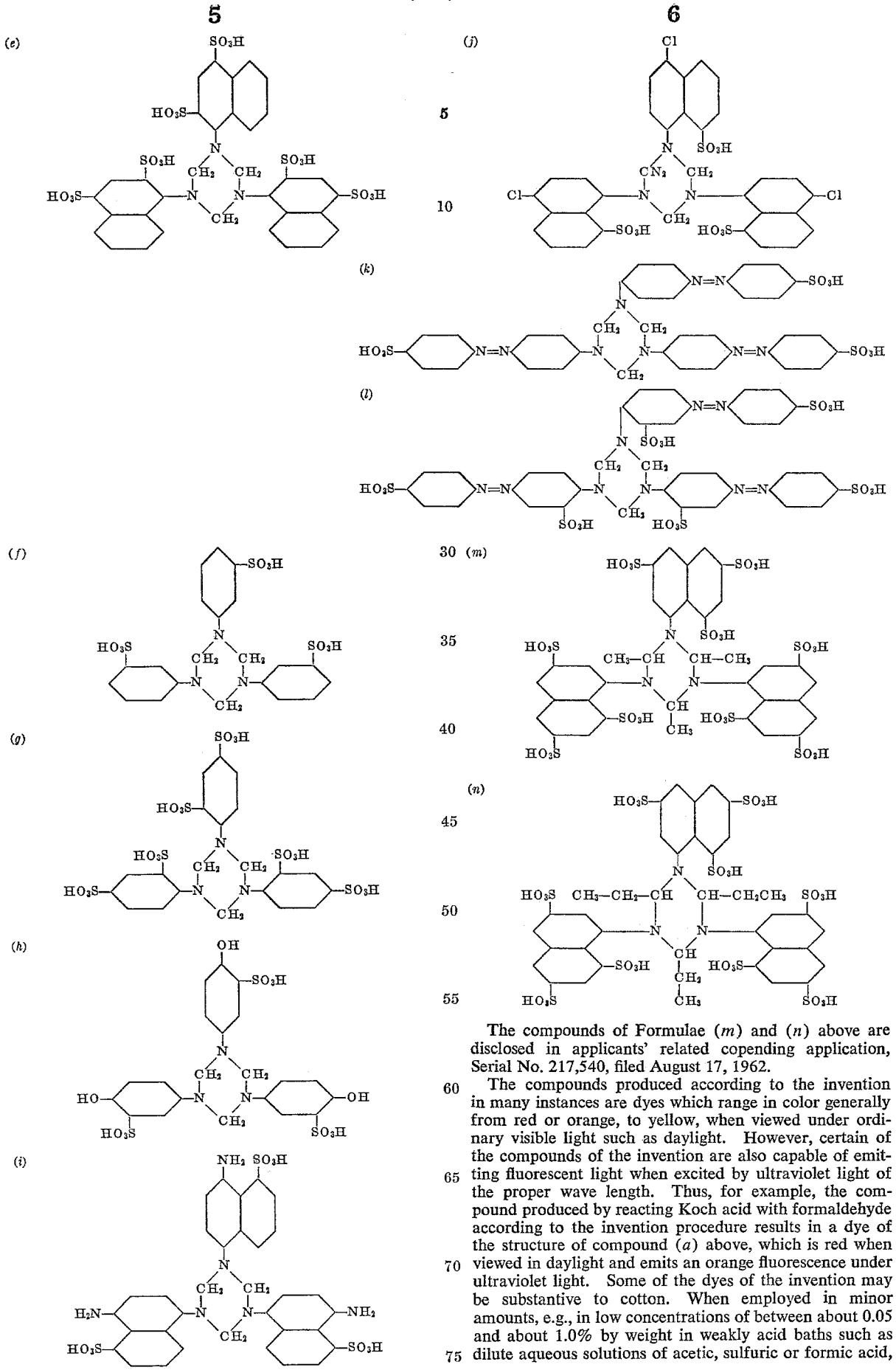

The compounds of Formulae (m) and (n) above are disclosed in applicants' related copending application, Serial No. 217,540, filed August 17, 1962.

The compounds produced according to the invention in many instances are dyes which range in color generally from red or orange, to yellow, when viewed under ordinary visible light such as daylight. However, certain of the compounds of the invention are also capable of emitting fluorescent light when excited by ultraviolet light of the proper wave length. Thus, for example, the compound produced by reacting Koch acid with formaldehyde according to the invention procedure results in a dye of the structure of compound (a) above, which is red when viewed in daylight and emits an orange fluorescence under ultraviolet light. Some of the dyes of the invention may be substantive to cotton. When employed in minor amounts, e.g., in low concentrations of between about 0.05 and about 1.0% by weight in weakly acid baths such as dilute aqueous solutions of acetic, sulfuric or formic acid, the dyes of the invention have been found to color both synthetic and natural fibers such as Acrilan, Cresalan, Zefran, nylon, wool and silk, with best results achieved thus far on nylon. The dyes of the invention are chemically stable and are substantially stable toward visible light over extended periods of exposure.

The following are examples of preparations of the novel compounds of the invention according to the procedure described herein, and of application of such compounds.

Example 1

To about 1 gram mol (393 g.) of 1-naphthylamine-3,6,8-trisulfonic acid (Koch acid) was added a formalin solution (about a 37% aqueous solution of formaldehyde) in an amount sufficient to give 1 gram mol (30 g.) of formaldehyde.

The resulting solution, which had a pH of between about 4 and about 4.5, was slowly heated at about 90° C. until reaction was completed, a period of about 20 to 30 minutes. Water was evaporated, and the product dried, giving about 350 grams of the condensation product represented by compound structure (a) above.

The product formed was soluble in water, and gave a dye which had a high red brilliance when observed by daylight and exceedingly strong orange fluorescence when viewed under ultraviolet light.

Example 2

The procedure of Example 1 was repeated, employing 1 gram mol of 8-amino-1-naphthol-3,6-disulfonic acid (H acid) instead of Koch acid, and temperature of reaction ranging from about 85° to about 95° C.

The product obtained is represented by compound structure (b) above. It was soluble in water and was a dye which gave a reddish brown color when viewed by daylight.

Example 3

The procedure of Example 1 was substantially followed employing 1 gram mol of 2-amino-5-naphthol-7-sulfonic acid (J acid) instead of Koch acid, and temperature of reaction ranging from about 85° to about 95° C.

The product obtained is represented by compound Formula (c) above, and was soluble in water, and was a dye which gave a reddish gray color when viewed by daylight.

Example 4

The procedure of Example 1 was substantially followed, employing 1 gram mol of 1-naphthylamine-8-sulfonic acid (peri acid) in place of Koch acid, and temperature of reaction ranging from about 85° to about 95° C.

The product obtained is shown in Formula (d) above. Such product was soluble in water and was a dye which gave an orange color when viewed by daylight.

Example 5

The procedure of Example 1 was substantially followed, employing 1 gram mol of 4-amino azo benzene-4'-sulfonic acid in place of Koch acid, and temperature of reaction ranging from about 85° to about 95° C.

The product obtained is represented by Formula (k) above. It was soluble in water and was a dye giving a reddish orange color.

Example 6

The procedure of Example 1 was substantially followed, employing 1 gram mol of 4-amino azo benzene-3,4'-disulfonic acid in place of Koch acid, and temperature of reaction ranging from about 85° to about 95° C.

The product obtained is represented by Formula (l) above. It was soluble in water and was a dye giving a reddish orange color.

Example 7

The procedure of Example 1 is substantially followed, employing 1 gram mol of 1-amino-4-hydroxybenzene-3-sulfonic acid, and temperature of reaction ranging from about 85° to about 95° C.

The product obtained is represented by Formula (h) above.

Example 8

The procedure of Example 1 is repeated but employing about 1.5 gram mols of formaldehyde. Substantially the same results are obtainable as in Example 1.

Example 9

The procedure of Example 1 is repeated, employing 1 gram mol of the disodium salt of Koch acid, 1-naphthylamine-3-sulfo-6,8-disodium sulfonate. The dye formed has the formula and has properties substantially the same as the dye formed in Example 1 and represented by Formula (a) above.

Example 10

The dye formed according to Example 1 and represented by Formula (a) above was employed for coloring nylon, wool, Acrilan and Cresalan, by the following procedure.

To a 0.01 N aqueous sulfuric acid solution was added an amount of compound (a) to provide a dye concentration of about 1% by weight of solution. The resulting solution was heated to about 125° F., and the fabrics (nylon, wool, Acrilan and Cresalan) were each introduced into separate portions of such bath. The temperature of the treating baths was then raised to about the boiling point thereof for a period of about one half hour. The fabrics were then removed from the dye bath and rinsed.

The nylon was colored a bright red when observed by daylight, and emitted a strong orange to red fluorescence when irradiated by ultraviolet light. The Acrilan and Cresalan had a strong red color by daylight but a relatively weaker red fluorescence under ultraviolet light as compared to the fluorescent emission from the nylon. The wool was colored a bright red when observed by daylight, but gave no fluorescent emission under ultraviolet light.

Example 11

The dye formed according to Example 5 and represented by Formula (k) above was dissolved in a 0.01 N aqueous sulfuric acid solution in amount sufficient to provide a dye concentration of about 1% by weight of the solution.

The procedure of Example 10 above was followed for treatment of cotton using the above solution containing compound (k). The so treated cotton was dyed yellow as observed by daylight.

From the foregoing, it is apparent that the invention provides a new class of compounds having valuable properties, particularly as dyes, and which may also possess fluorescent properties, and to a process for preparing such compounds readily, said dyes being suitable for coloring natural and synthetic fibers.

While we have described particular embodiments of our invention for purposes of illustration, it should be understood that various modifications and adaptations thereof may be made within the spirit of the invention, as set forth in the appended claims.

We claim:
1. A compound having the formula
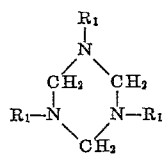
where R₁ is sulfonated naphthyl.
2. A compound having the formula
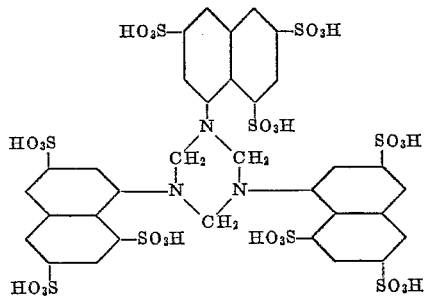
3. A compound having the formula
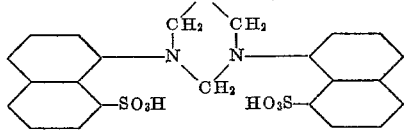
References Cited by the Examiner
UNITED STATES PATENTS
2,365,405 12/1944 Gartner et al. _____ 260—248
2,889,277 6/1959 Hughes _____ 260—248 X
CHARLES B. PARKER, *Primary Examiner.*